(12) United States Patent
Donovan et al.

(10) Patent No.: US 8,287,113 B2
(45) Date of Patent: Oct. 16, 2012

(54) INK SET AND MEDIA FOR INK-JET PRINTING

(75) Inventors: David Donovan, San Diego, CA (US); Stephen W Bauer, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 567 days.

(21) Appl. No.: 12/527,390

(22) PCT Filed: Feb. 13, 2008

(86) PCT No.: PCT/US2008/053828
§ 371 (c)(1),
(2), (4) Date: Aug. 14, 2009

(87) PCT Pub. No.: WO2008/106322
PCT Pub. Date: Sep. 4, 2008

(65) Prior Publication Data
US 2010/0091079 A1    Apr. 15, 2010

Related U.S. Application Data

(60) Provisional application No. 60/903,921, filed on Feb. 28, 2007.

(51) Int. Cl.
*G01D 11/00*    (2006.01)
(52) U.S. Cl. .................. 347/100; 347/95; 106/31.13
(58) Field of Classification Search .................. 347/100, 347/95, 9, 6, 101, 102, 88, 99; 106/31.27, 106/31.6, 31.13; 523/160, 161
See application file for complete search history.

(56) References Cited

U.S. PATENT DOCUMENTS

| | | | |
|---|---|---|---|
| 6,336,705 B1 | 1/2002 | Torigoe | |
| 6,378,974 B1 | 4/2002 | Oelbrandt et al. | |
| 2004/0252162 A1* | 12/2004 | Gondek et al. | 347/43 |
| 2006/0012655 A1* | 1/2006 | Gondek et al. | 347/100 |
| 2006/0181587 A1* | 8/2006 | Bauer et al. | 347/100 |
| 2006/0284929 A1 | 12/2006 | Matsuzawa et al. | |

FOREIGN PATENT DOCUMENTS

| | | |
|---|---|---|
| EP | 1690904 A1 | 8/2006 |
| JP | 2000-343731 | 12/2000 |
| JP | 2004-034337 | 2/2004 |
| JP | 2005-320540 | 11/2005 |

OTHER PUBLICATIONS

PCT International Search Report for Application No. PCT/US2008/053828, filed Feb. 13, 2008. ISR issued Aug. 4, 2008.

* cited by examiner

*Primary Examiner* — Manish S Shah

(57) ABSTRACT

An ink-jet printing system includes an ink set having only cyan, magenta, yellow black and gray inks, and a medium having a substantially neutral color. A ratio of printed lightness of the gray ink to a lightness of the medium ranges from 0.3 to 0.7.

21 Claims, 1 Drawing Sheet

INK SET AND MEDIA FOR INK-JET PRINTING

CROSS-REFERENCE TO RELATED APPLICATIONS

This application claims the benefit of U.S. Provisional Patent Application Ser. No. 60/903,921, filed Feb. 28, 2007.

BACKGROUND

The present disclosure relates generally to ink-jet printing, and more particularly to an ink set and media for ink-jet printing.

Ink-jet printing is a non-impact method for producing images by the deposition of ink droplets in a pixel-by-pixel manner to an image-recording medium in response to appropriate commands, such as digital signals.

To generate full color prints using ink-jet printing, ink sets having components of various colors and/or hues are used. Generally, ink sets having cyan, magenta, and yellow inks are utilized. In addition, a black ink is often added to enhance the printing of text and darker colors. Simple four-color systems like CMYK (cyan, magenta, yellow, and black) ink systems provide economical solutions for color printing. Systems incorporating six-inks or more have been developed to provide, in some instances, increased color gamut and finer grain characteristics than the four-ink systems. However, these systems may, in some instances, increase metamerism, ink consumption, and/or printing complexity.

Further, to achieve high image quality, photo-base papers have typically been used as the substrate in print media. While photo-base papers provide high image quality, they may generally be more expensive than paper-base papers and may add to the overall cost of the print media. Furthermore, photo-base papers, in some instances, do not readily absorb the ink vehicle used in the ink-jet ink. Generally, a high coatweight of an ink-receiving layer (e.g. greater than about 25 grams per square meter ("GSM")), may be necessary to absorb the ink vehicle. In addition, multiple layers may be used as the ink-receiving layer to separate the colorant from the ink vehicle to improve coalescence. Still further, images printed on photo-base paper may, in some instances, have poor bleed characteristics and color fastness under humid conditions.

BRIEF DESCRIPTION OF THE DRAWINGS

Features and advantages of embodiments of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
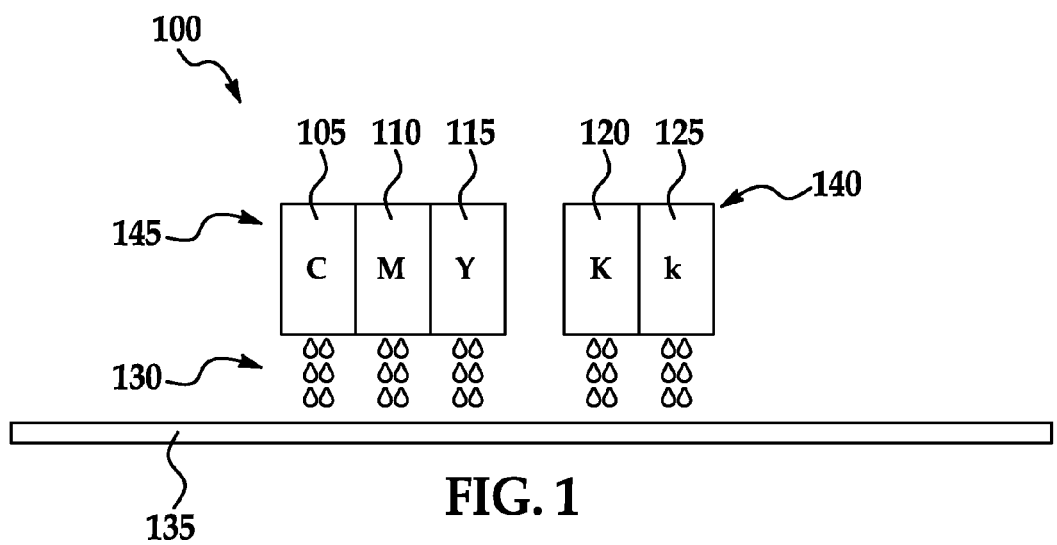
FIG. 1 is a diagram of an exemplary embodiment of a printing system according to the present disclosure.

Printed images that have a similar image quality to that of a photograph are referred to herein as photographic quality images. A photographic quality image may include saturated colors, high gloss and gloss uniformity, freedom from grain and coalescence, and/or a high degree of permanence. To produce the photographic quality image, the inkjet ink and print medium should be compatible with one another. In addition, the ink-jet ink should have low puddling, good crusting resistance, good stability, high color gamut, low color-to-color bleed, and/or a rapid dry time. Further, the print medium used to print the photographic quality image should be fast drying and resist smearing, air, light, and moisture, while providing good color fidelity and high image resolution. Embodiment(s) of the ink set and media of the present disclosure advantageously substantially provide these properties.

Embodiment(s) of the ink set of the present disclosure may have a color gamut that substantially matches the color gamut for a silver halide (AgX) system, and thus may advantageously be a replacement for the AgX system. The ink set according to embodiments of the present disclosure may advantageously provide the color scheme that the AgX halide system provides, including, but not limited to, the blues, violets, magentas, reds, yellows, cyans, and greens. Further, embodiment(s) of the multi-colorant ink set system may be suitable for use in applications that include, but are not limited to ink-jet printing/photoprinting.

As used in the present application, printed colors, as they are perceived visually, are described in reference to CIELAB space, which describes visually perceivable colors within a three-dimensional space having three coordinates ($L^*$, $a^*$, $b^*$). Accordingly, the use of the term "lightness" herein refers to an $L^*$ coordinate in CIELAB space, which may range from 0 (black) to 100 (white). Consequently, a first color exhibiting increased lightness over a second color has a greater $L^*$ coordinate than the second color. Likewise, a first color exhibiting decreased lightness over a second color has a smaller $L^*$ coordinate than the second color.

As used in the present application, the terms "$a^*$" and "$b^*$" refer to hue coordinates of a color in CIELAB space. Specifically, the term "$a^*$" refers to a color's position between magenta and green and the term "$b^*$" refers to a color's position between blue and yellow.

It should be understood that the ink sets of the present application and their corresponding systems and methods, and performance attributes are in no way limited by or to any specific measurement system. Color measurement systems such as Hunter Lab, CIE XYZ space, CIELUV, RGB, KCMY, and others may be used to describe the attributes and effects of various aspects of the present application.

As used in the present application, the term "light ink" refers to an ink having an average printed lightness ($L^*$) that is within 50 to 100% of a lightness ($L^*$) of a white print media having a substantially neutral hue.

As used in the present application, a "medium/dark" ink refers to an ink having an average printed lightness ($L^*$) that is within 25% to 77% of a lightness ($L^*$) of a white print media having a substantially neutral hue.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a range of ratios from 0.01 to 0.50 should be interpreted to include not only the explicitly recited ratio limits of 0.01 to 0.50, but also to include individual ratios such as 0.02, 0.03, 0.20, 0.40 and sub-ranges such as 0.01 to 0.25, 0.15 to 0.45, etc.

As used in the present application, the singular forms of the articles "a," "an," and "the" include plural referents unless the content clearly dictates otherwise. Further, the phrase "effective amount," as used herein, refers to the minimal amount of a substance and/or agent, which is sufficient to achieve a desired and/or required effect. For example, an effective amount of an "ink vehicle" is the minimum amount required in order to create an ink composition, while maintaining properties necessary for effective ink-jet printing.

A non-limiting embodiment of the ink-set includes at least a medium cyan ink-jet ink, a magenta ink-jet ink, and a gray ink-jet ink. The medium cyan, gray and magenta inks may be formulated to provide essentially balanced dot visibility when administered on an image-recording medium. Still further, the inks may be configured to have substantially matched lightness.

It is to be understood that embodiment(s) of the ink set when applied to a medium may advantageously provide a printed blend of color having a neutrality and/or a balanced fade such that if color(s) fade, they fade evenly; as such, the hue as printed remains substantially the same over time. It is to be understood that fade may be evaluated by monitoring the density of three color channels (e.g. cyan, magenta, and yellow). Balanced fade, as used herein, occurs when the density loss from a neutral color patch is similar across all three channels. Secondary colors produced from mixtures of two inks (e.g. red, green, and blue) will fade neutrally if the density of the two primary colors used to print the secondary colors fade similarly.

Further, the effects of the humid bleed phenomenon (e.g. colors migrating outward into other colored or unprinted areas) and/or the humid hue shift phenomenon (e.g. slight colorant migration causing increased color to be realized from one or more of the inks printed in a certain area) may be substantially decreased and/or substantially eliminated with the ink set according to embodiment(s) of the present disclosure. It is to be understood that generally humid hue shift may occur primarily on photo media, while humid bleed may occur on both polymeric and porous media.

Embodiments of the ink set may advantageously have a lower ink consumption than traditional four (black, cyan, magenta, yellow) and six (black, cyan, magenta, yellow, light cyan, light magenta) ink systems. Without being bound to any theory, it is believed that the combination of black and gray inks provides the inherent neutrality that a composite black (K) (generally using cyan, magenta and yellow to make gray) may not provide without closed loop color calibration. Still further, the usage of black and gray inks to darken colors, rather than using composite black, may also improve color gamut and metamerism.

Additionally, embodiments of the ink set and its corresponding systems may exhibit improved color reproduction accuracy and/or consistency over traditional four and six ink systems. As such, the use of a gray ink in conjunction with black, cyan, magenta, and yellow inks may provide an increased gamut of printable colors while decreasing the amount of ink required to create composite darker colors.

With this in mind, embodiment(s) of the present disclosure are drawn to systems and ink-jet ink sets which may advantageously provide improved gamut, improved lightfastness, and a minimum number of inks, while maintaining good chroma, lightness, matched fade, neutrality, low grain, low ink usage, and/or reduction/substantial elimination of humid bleed.

Referring now to FIG. 1, certain colorants, such as pigments or dyes, may be used in ink-jet inks that substantially improve the print quality of the printed images. It is contemplated that the these colorants may be used in a system (100) having multi-colorant ink sets having at least a cyan ink (105), a magenta ink (110), a yellow ink (115), a black ink (120), and a gray ink (125), in which the cyan, magenta, yellow, black and gray inks (105, 110, 115, 120, 125) may be configured and/or formulated to exhibit increased color reproduction accuracy, exhibit increased color reproduction consistency, improve lightfastness, and/or reduce costs of images printed with the ink sets.

The inks (105, 110, 115, 120, 125) of the present embodiment may be contained in one or more printheads (140, 145). The printheads (140, 145) may include individual ink containers, with each ink container designed to hold a different color of ink. The printheads (140, 145) may further include inkjet nozzles to deposit tiny droplets (130) the inks (105, 110, 115, 120, 125) on a print medium (130). In an alternative embodiment, there may also be in a six-ink printhead, for example, rather than ink, an individual container of gloss enhancer in one of the printheads.

The print medium (130) includes a substantially neutral color. As a color having absolute neutrality in CIELAB space includes hue coordinates of (a*=0, b*=0), a medium (130) having a substantially neutral color may include an a* coordinate with a maximum deviation from 0 of about ±5 and a b* coordinate having a maximum deviation from 0 of about ±5. Generally print media used with ink sets of the present application may include an a* coordinate ranging from −1 to 1 and a b* coordinate ranging from −5 to −1 in microporous glossy and semigloss media, which tend to be slightly blue. Other slightly whiter print media may include a* and b* coordinates deviations within ±2 of 0.

The gray ink (125) includes a printed lightness (L*) between 30% and 70%, the lightness (L*) of said print medium (130). The gray ink (125) may further include an a* hue coordinate within ±1 of the a* value corresponding to the substantially neutral color of the print medium (130). The gray ink (125) may also include a b* hue coordinate within 2 points of the b* value corresponding to the substantially neutral color of the print medium (130).

The gray ink (125) may prove useful as a color having minimal hue deviation from the hue of the print medium (130). In this manner, different composite color shades may be more accurately and easily printed than with standard CMY or KCMY ink sets. Less of cyan, magenta, and yellow inks (105, 110, 115) may be required to create certain darker composite colors when a gray ink (125) having minimal deviation from the substantially neutral color of the print medium is present. Furthermore, printed darker shades that include the gray ink (125) as described herein may be more accurate representations of the colors as they were originally intended to be printed.

In some embodiment(s) of the ink set, the cyan ink (105), magenta ink (110), and gray ink (125) may have respective lightness values (L*) within a deviation of about ±5 of each another. More specifically, it is contemplated that L* for the magenta ink (110) and the cyan ink (105) may be within about ±5 of the L* of the gray ink. It is to be understood that L* deviations may be smaller, with deviations of about ±1 being desirable.

In a non-limiting embodiment, the cyan, magenta, and gray inks (105, 110, 115, respectively) may have L* values ranging between about 65 and about 95. More specifically, the cyan, magenta, and gray inks (105, 110, 115) may have L* values between about 80 and about 85. L* values discussed herein are measured at 279 drops per square millimeter with a drop size of 8 nanograms. It is to be understood that the L* values may be measured at any suitable parameters, including, but not limited to, the ink limit of the media used.

It is to be understood that gray ink-jet inks, cyan ink-jet inks, yellow ink-jet inks, and magenta ink-jet inks according to the principles described herein may be used in various ink sets that include additional inks selected to provide the desired and/or required characteristics (non-limiting examples of which include color gamut and color brightness). Thus, the ink set may include other ink(s) or other fluids such as gloss enhancers as desired and/or required. Examples of suitable additional ink-jet inks include, but are not limited to black, darker gray, darker cyan, darker yellow, darker magenta, lighter gray, lighter cyan, lighter yellow, and lighter magenta.

Figure 2:
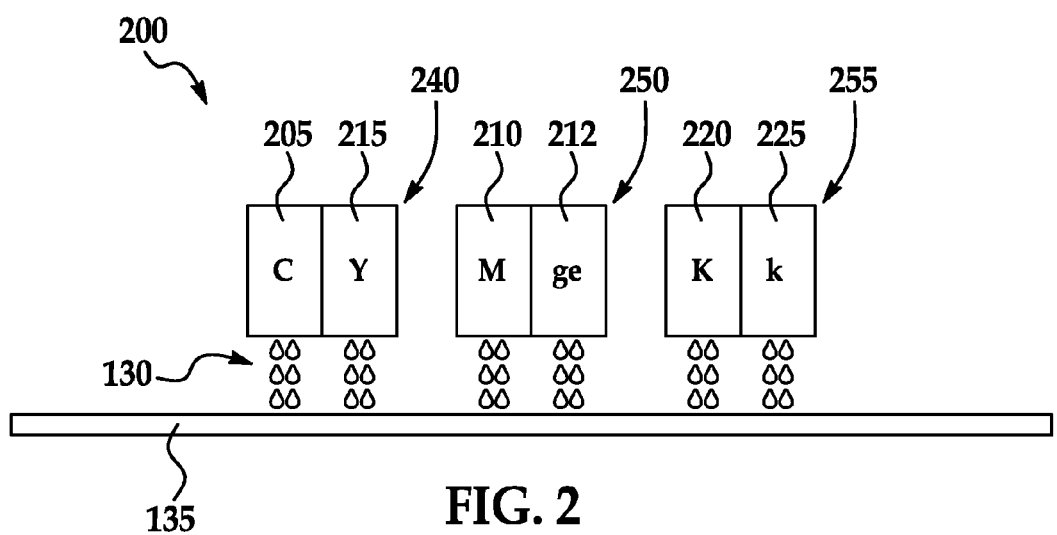
FIG. 2 is a diagram of an exemplary embodiment of a printing system according to the present disclosure.

Referring now to FIG. 2, in a non-limiting embodiment of an inkjet system (200) having five inks and a gloss enhancer (212) in a six-ink ink set, the lightness L* values of the various ink are as follows: gray ink (225)=81.3, cyan ink (205)=83.3, yellow ink (215)=93, black ink (220)=68.8, and magenta ink (210)=76.9. In this example, the lightness values are measured at 279 drops per square millimeter. However, it is to be understood that these L* values are to be considered illustrative and not limiting, as a change in system drop weight would give a different L* for the identical ink at the specified number of drops per square mm.

As disclosed herein, the selected gray ink (225) may exhibit color perception characteristics that are compatible with a selected black ink-jet ink such that noticeable differences at transition are minimized. The L* for the gray ink (225) when deposited on an image-receiving media may be essentially equivalent to the L* of a single dot of the black ink. In an embodiment, the black ink (220) and the gray ink (225) substantially define a neutral axis. Without being bound to any theory, it is believed that this may advantageously substantially decrease and/or eliminate grain during the transition from gray to black.

Figure 3:
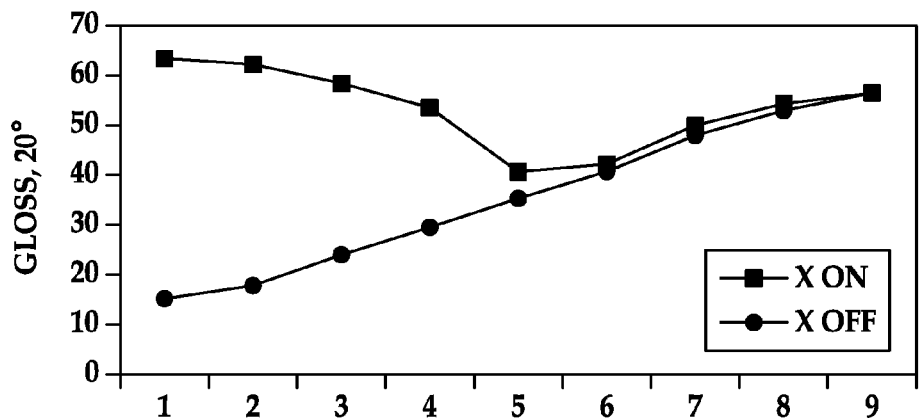
FIG. 3 is a comparative graph showing the effect of gloss enhancer on gloss uniformity of a printed medium according to principles described herein.

In an embodiment of the ink set, six ink pens may be included. An embodiment of the six-pen ink set includes a subset having the gray ink-jet ink (225), the cyan ink-jet ink (205), and the gloss enhancer (212) ink-jet ink. In some embodiments the inks of this subset may have essentially matched lightness (L*). Additionally, three other ink-jet inks (non-limiting examples of which include black, magenta, and yellow) are included in the ink set. FIG. 3, described in more detail in Example 2, gives a comparative graph showing the effects of gloss enhancer (212) ink-jet ink on cyan ink-jet ink (205) printed on Premium Glossy Photo Paper (PGPP) print medium (135).

The six ink pens may be housed in three printheads (240, 250, 255). The printheads may facilitate the deposition of ink droplets (130) on a print medium (135). In some embodiments, the print medium (135) is porous. In other embodiments the print medium (135) may include a swellable ink-receiving layer.

In the practice of embodiment(s) of the present disclosure, each color of the ink set may be present in more than one ink, each having more than one colorant load, for example. In an embodiment, there may be one or more ink-jet pens filled for each ink color, each pen having a different colorant load, a different colorant, different vehicle components, and/or different amounts of vehicle components, for example. In a non-limiting example, the ink set includes two magenta pens, each containing a different colorant load.

The inks utilized in the ink sets disclosed herein may each be composed of suitable pigments, dyes and auxiliary materials necessary to provide deposition through a suitable ink-jet device onto an image-receiving medium. Similarly, it is contemplated that black and other auxiliary inks may be formulated to function with the magenta, cyan and gray inks. It is contemplated that the pigments, dyes and various auxiliary materials employed will be compositions formulated to provide characteristics approaching, equaling or exceeding the characteristics (non-limiting examples of which include gloss, gamut, durability, image quality and/or grain) achieved with silver halide (AgX) printing.

The choice of the colorants in the ink set described herein may be governed by characteristics including, among others, lightness, color gamut, humid bleed, printhead nozzle health, and/or the like. The color gamut of an ink set may be controlled primarily by the spectral absorption characteristics of the component colorants. In addition to the light absorption characteristics of the colorants, the maximum print density achieved from the ink is another important factor to provide a high color gamut. Thus, the materials may be chosen to provide appropriate print density.

A pigment or any number of pigment blends may be provided in the ink-jet ink formulation to impart color to the resulting ink. In one exemplary aspect, the pigment may be any number of desired pigments dispersed throughout the resulting ink-jet ink. More particularly, the pigment included in the present ink-jet ink may include, but is in no way limited to, self-dispersed (surface modified) pigments, or pigments accompanied by a dispersant.

Suitable pigments that may be included in the present inkjet ink can be gray pigments, black pigments, white pigments, cyan pigments, magenta pigments, yellow pigments, or the like. Further, pigments can be organic or inorganic particles as is well known in the art. Suitable inorganic pigments include, for example, carbon black. However, other inorganic pigments may be suitable such as titanium oxide, cobalt blue ($CoO-Al_2O_3$), chrome yellow ($PbCrO_4$), and iron oxide.

Suitable organic pigments include, for example, azo pigments including diazo pigments and monoazo pigments, dioxazine pigments, polycyclic pigments (e.g., phthalocyanine pigments such as phthalocyanine blues and phthalocyanine greens, perylene pigments, perinone pigments, anthraquinone pigments, quinacridone pigments, dioxazine pigments, thioindigo pigments, isoindolinone pigments, pyranthrone pigments, and quinophthalone pigments), insoluble dye chelates (e.g., basic dye type chelates and acidic dye type chelates), nitropigments, nitroso pigments, anthanthrone pigments such as PR168, and the like.

Representative examples of dioxazine pigments include violet pigments such as Pigment Violet 23.

Representative examples of phthalocyanine blues and greens include copper phthalocyanine blue, copper phthalocyanine green and derivatives thereof (e.g. Pigment Blue 15:3 and Pigment Green 36).

Representative examples of quinacridones include Pigment Orange 48, Pigment Orange 49, Pigment Red 122, Pigment Red 192, Pigment Red 202, Pigment Red 206, Pigment Red 207, Pigment Red 209, Pigment Violet 19 and Pigment Violet 42.

Representative examples of anthraquinones include Pigment Red 43, Pigment Red 194 (Perinone Red), Pigment Red 177, Pigment Red 216 (Brominated Pyranthrone Red) and Pigment Red 226 (Pyranthrone Red).

Representative examples of perylenes include Pigment Red 123 (Vermillion), Pigment Red 149 (Scarlet), Pigment Red 179 (Maroon), Pigment Red 190 (Red), Pigment Red 189 (Yellow Shade Red) and Pigment Red 224.

Representative examples of thioindigoids include Pigment Red 86, Pigment Red 87, Pigment Red 88, Pigment Red 181, Pigment Red 198, Pigment Violet 36, and Pigment Violet 38.

Representative examples of heterocyclic yellows include Pigment Yellow 1, Pigment Yellow 3, Pigment Yellow 12, Pigment Yellow 13, Pigment Yellow 14, Pigment Yellow 17, Pigment Yellow 65, Pigment Yellow 73, Pigment Yellow 74, Pigment Yellow 90, Pigment Yellow 110, Pigment Yellow 117, Pigment Yellow 120, Pigment Yellow 128, Pigment Yellow 138, Pigment Yellow 150, Pigment Yellow 151, Pigment Yellow 155, and Pigment Yellow 213.

Such pigments are commercially available in either powder or press cake form from a number of sources including, BASF Corporation, Engelhard Corporation and Sun Chemical Corporation.

Examples of black or gray pigments that can be used include carbon pigments. The carbon pigment can be almost any commercially available carbon pigment that provides acceptable optical density and print characteristics. Carbon pigments suitable for use in the present system and method include, without limitation, carbon black, graphite, vitreous carbon, charcoal, and combinations thereof. Such carbon pigments can be manufactured by a variety of known methods such as a channel method, a contact method, a furnace method, an acetylene method, or a thermal method, and are commercially available from such vendors as Cabot Corporation, Columbian Chemicals Company, Degussa AG, and E.I. DuPont de Nemours and Company. Suitable carbon black pigments include, without limitation, Cabot pigments such as MONARCH 1400, MONARCH 1300, MONARCH 1100, MONARCH 1000, MONARCH 900, MONARCH 880, MONARCH 800, MONARCH 700, CAB-O-JET 200, CAB-O-JET 300, REGAL, BLACK PEARLS, ELFTEX, MOGUL, and VULCAN pigments; Columbian pigments such as RAVEN 7000, RAVEN 5750, RAVEN 5250, RAVEN 5000, and RAVEN 3500; Degussa pigments such as Color Black FW 200, RAVEN FW 2, RAVEN FW 2V, RAVEN FW 1, RAVEN FW 18, RAVEN S160, RAVEN FW S170, Special Black 6, Special Black 5, Special Black 4A, Special Black 4, PRINTEX U, PRINTEX 140U, PRINTEX V, and PRINTEX 140V; and TIPURE R-101 available from Dupont. The above list of pigments includes unmodified pigment particulates, small molecule attached pigment particulates, and polymer-dispersed pigment particulates.

To impart a black or gray color to an ink formulation, one or more black pigments as described above may be used. However, some black pigments may not include a sufficiently neutral hue (either with respect to absolute color neutrality or a substantially neutral hue of a print medium) to accomplish the purposes of an ink. In such cases, additional pigments and/or dyes may be added to an ink formulation to produce a suitable gray. For example, suitable black and gray ink formulations may in some embodiments include a combination of carbon black, PV23 violet, and PB15:3 cyan pigments.

Similarly, a wide variety of colored pigments can be used with the present system and method, therefore the following listing is not intended to be limiting. For example, colored pigments can be blue, brown, cyan, green, white, violet, magenta, red, orange, yellow, as well as mixtures thereof. The following color pigments are available from Cabot Corp.: CAB-O-JET 250C, CAB-O-JET 260M, and CAB-O-JET 270Y. The following color pigments are available from BASF Corp.: PALIOGEN Orange, PALIOGEN Orange 3040, PALIOGEN Blue L 6470, PALIOGEN Violet 5100, PALIOGEN Violet 5890, PALIOGEN Yellow 1520, PALIOGEN Yellow 1560, PALIOGEN Red 3871 K, PALIOGEN Red 3340, HELIOGEN Blue L 6901F, HELIOGEN Blue NBD 7010, HELIOGEN Blue K 7090, HELIOGEN Blue L 7101 F, HELIOGEN Blue L6900, L7020, HELIOGEN Blue D6840, HELIOGEN Blue D7080, HELIOGEN Green L8730, HELIOGEN Green K 8683, and HELIOGEN Green L 9140. The following pigments are available from Ciba-Geigy Corp.: CHROMOPHTAL Yellow 3G, CHROMOPHTAL Yellow GR, CHROMOPHTAL Yellow 8G, IGRAZIN Yellow 5GT, IGRALITE Rubine 4BL, IGRALITE Blue BCA, MONASTRAL Magenta, MONASTRAL Scarlet, MONASTRAL Violet R, MONASTRAL Red B, and MONASTRAL Violet Maroon B. The following pigments are available from Heubach Group: DALAMAR Yellow YT-858-D and HEUCOPHTHAL Blue G XBT-583D. The following pigments are available from Hoechst Specialty Chemicals: Permanent Yellow GR, Permanent Yellow G, Permanent Yellow DHG, Permanent Yellow NCG-71, Permanent Yellow GG, Hansa Yellow RA, Hansa Brilliant Yellow 5GX-02, Hansa Yellow-X, NOVOPERM Yellow HR, NOVOPERM Yellow FGL, Hansa Brilliant Yellow 10GX, Permanent Yellow G3R-01, HOSTAPERM Yellow H4G, HOSTAPERM Yellow H3G, HOSTAPERM Orange GR, HOSTAPERM Scarlet GO, HOSTAPERM Pink E, Permanent Rubine F6B, and the HOSTAFINE series. The following pigments are available from Mobay Corp.: QUINDO Magenta, INDOFAST Brilliant Scarlet, QUINDO Red R6700, QUINDO Red R6713, and INDOFAST Violet. The following pigments are available from Sun Chemical Corp.: L74-1357 Yellow, L75-1331 Yellow, and L75-2577 Yellow. Other examples of pigments can include Normandy Magenta RD-2400, Permanent Violet VT2645, Argyle Green XP-111-S, Brilliant Green Toner GR 0991, Sudan Blue OS, PV Fast Blue B2GO1, Sudan III, Sudan II, Sudan IV, Sudan Orange G, Sudan Orange 220, Ortho Orange OR 2673, Lithol Fast Yellow 0991 K, Paliotol Yellow 1840, Lumogen Yellow D0790, Suco-Gelb L1250, Suco-Yellow D1355, Fanal Pink D4830, Cinquasia Magenta, Lithol Scarlet D3700, Toluidine Red, Scarlet for Thermoplast NSD PS PA, E. D. Toluidine Red, Lithol Rubine Toner, Lithol Scarlet 4440, Bon Red C, Royal Brilliant Red RD-8192, Oracet Pink RF, and Lithol Fast Scarlet L4300. These pigments are available from commercial sources such as Hoechst Celanese Corporation, Paul Uhlich, BASF, American Hoechst, Ciba-Geigy, Aldrich, DuPont, Ugine Kuhlman of Canada, Dominion Color Company, Magruder, and Matheson. Examples of other suitable colored pigments are described in the Colour Index, 3rd edition (The Society of Dyers and Colourists, 1982).

The above-illustrated pigments can be used singly or in combination of two or more. Typically, the pigments of the present system and method can be from about 10 nm to about 10 μm and in one aspect can be from 10 nm to about 500 nm in diameter, although sizes outside this range can be used if the pigment can remain dispersed and provide adequate color properties. In one detailed aspect of the present system and method, the pigment can include from about 1% to about 20% by weight of the inkjet ink composition, and often can include from about 2% to about 6% by weight of the inkjet ink composition.

As mentioned previously, the colorants of the present exemplary system and method can further include a dispersant attached thereto. In one specific embodiment, the dispersant can include, but is in no way limited to, a carboxylic acid, however, reactive groups such as alcohol, amine, anhydride, sulfonic acid, thiol, halotriazine, maleimide and vinyl sulfone, or the like can also be used. A wide variety of dispersants are known to those skilled in the art. Non-limiting examples broad classes of suitable dispersants include polyalkyl glycols, polyalkyl imines, aryl dicarboxylic acids such as phthalic acids, isophthalic acids, terephthalic acids, carbohydrates, acrylates, methacrylates, trehalose, isomers thereof, and combinations thereof. As a general matter, glycol dispersants tend to be stable at neutral and higher pH, while imine dispersants tend to be stable at lower pH, e.g., about 4-6. In one specific embodiment, the dispersant can be polyethylene glycol. Dispersants can help to improve dispersion stability, but also can improve bleed control. Non-limiting examples of several specific suitable dispersants include polypropylene glycol, polyethylene imine, polyethylene glycol, trehalose, and combinations thereof. In some embodiments, the pigment may also have a polymer coupled thereto, the polymer being additionally coupled to a dispersant, such that the pigment is polymer-dispersed. Non-limiting examples of medium cyan dyes include water soluble copper or nickel phthalocyanine dyes such as Direct Blue 86, Direct Blue 199, or Direct Blue 307, as well as derivatives of aluminum phthalocyanine.

Non-limiting examples of magenta dyes include water soluble azo dyes such as Direct Violet 107 or Reactive Red 31; water soluble transition metal complexes of an 8-heterocyclylazo-5-hydroxy quinoline, such as those described in U.S. Pat. Nos. 5,997,622 and 6,001,161, which are incorporated herein by reference in their entirety; anthrapyridone dyes such as those described in WO publication 01-18123, which is incorporated herein by reference in its entirety; Pigment Red 122; Acid Red (AR) 52 and AR 289.

Non-limiting examples of gray dyes include passified reactive black 31, K1334 available from Ilford Imaging in Switzerland, Duasyn NB-SF (available from Clariant located in Coventry, R.I.), Direct Black 168, Reactive Black 8, and Acid Black 52. It is to be understood that alone these dyes may not be sufficiently neutral, therefore blending one or more of them together (as described in U.S. Pat. No 6,503,308, which is incorporated herein by reference in its entirety) and/or with cyan, magenta, and/or yellow dyes may be desired and/or necessary to achieve a desired neutral shade.

The black ink of choice will be formulated in a manner such that it is compatible with the gray ink employed in the ink set. Gray/black compatibility may be determined by light fade and visibility. Ideally, a single dot of black ink present in a field of gray ink, both of which are deposited on an image-receiving medium, will be at least minimally perceptible.

Non-limiting examples of the black dye are water soluble metal complex azo dyes such as Reactive Black 31 and Reactive Black 8, water soluble polyazo dyes such as Direct Black 19, Direct Black 195, and Direct Black 168, water soluble sulfur dyes such as Solubilized Sulfur Black 1, materials such as carbon black or derivatives of carbon black, and pRB31.

Some black dyes may be suitable for use in both the black ink and the gray ink. Examples of such dyes include, but are not limited to Reactive Black 31, Duasyn-NB-SF, and K1334.

Embodiment(s) of the ink set may also include inks of additional colors in order to match a silver halide gamut as desired and/or required. In one embodiment, a set having the cyan, magenta, gray, and black inks may also include a suitable yellow ink and a suitable dark magenta ink (generally having a darker hue/color than the other magenta ink).

Non-limiting examples of yellow dyes include water soluble azo dyes as well as metal complex yellow dyes. Suitable water soluble azo dyes include, but are not limited to Direct Yellow 86, Direct Yellow 107, Direct Yellow 132, acid yellow 17, and acid yellow 23. Other suitable yellow dyes include Y104, Y1189 (both of which are commercially available from Ilford Imaging located in Switzerland), and/or mixtures thereof.

It is to be understood that a blend of dyes and/or pigments having different colors may be used to form the various ink colors. For example, a gray ink may contain Duasyn-NB-SF (black dye), DJR-814, and Y1189 (yellow dye). Still further, a magenta ink may have a combination of DJR-814 Na (magenta dye) and AR 52 Na (magenta dye). Non-limiting examples of blends of colors (and their corresponding UV absorbance) to form various gray and black dyes used in embodiments of the ink sets are incorporated into the following table.

TABLE 1

| Weight Percentage Concentration of Ink Ingredients based on UV Absorbance Values of Black (K) and Gray (k) Ink Formulations | | | | | | | |
|---|---|---|---|---|---|---|---|
| Ingredients | K1 | K2 | K3 | k1 | k2 | K3 | k4 |
| DJR-814 Na | 0.01 | 0.013 | 0.01 | 0.0089 | 0.00445 | 0.0089 | 0.00445 |
| Y1189 | 0.01 | 0.007 | 0.01 | 0.00445 | 0.002225 | 0.002225 | 0.00445 |
| Duasyn NB-SF | 0.08 | 0.02 | 0.08 | 0.0267 | 0.0267 | 0.0267 | 0.0267 |
| Table 2 Composition | 50 | 50 | 50 | 50 | 50 | 50 | 50 |
| Water | Balance | Balance | Balance | Balance | Balance | Balance | Balance |

It is to be understood that the ink formulations may also include additional ingredients. Suitable additional ingredients include, but are not limited to, those listed in Table 2. For example, additives such as ethylhydroxy-propanediol (EHPD); 2-pyrrolidone; and 1, 5 pentanediol can be used. Furthermore, surfactants can be included, such as those, as non-limiting examples, that are commercially available under the tradenames DOWFAX 2A 1 from Dow Chemical Co. located in Midland, Mich., SURFYNOL CT-111 from Air Products located in Allentown, Pa., and ZONYL FSA from Dupont located in Wilmington, Del. Buffers can also be used, such as those commercially available under the tradename MOPS from Brinkmann located in Westbury, N.Y. as a non-limiting example. Ethylenediaminetetraacetic acid (EDTA) may also be included. Biocides may also be used, including, but not limited to 1,2-benzisothiazolin-3-one (commercially available under the tradename PROXEL GXL from Zeneca AG Products, Inc. located in Wilmington, Del.; mixtures thereof; and/or the like.

TABLE 2

| Additional Ingredients | | |
|---|---|---|
| Composition Ingredient | Active | Wt % |
| EHPD | 100 | 12 |
| 2-Pyrrolidone | 100 | 6.5 |

TABLE 2-continued

Additional Ingredients

| Composition Ingredient | Active | Wt % |
|---|---|---|
| 1,5 Pentanediol | 100 | 2 |
| Dowfax 2A1 | 100 | 0.32 |
| Surfynol CT-111 | 100 | 0.16 |
| Zonyl FSA | 100 | 0.8 |
| MOPS | 100 | 0.05 |
| EDTA, di Na | 100 | 0.01 |
| Proxel GXL | 100 | 0.2 |

It is contemplated that printing procedures employing the ink set utilizing the medium cyan, magenta, gray, and black inks will have a neutral axis defined solely using the black and gray inks. Additionally, darkening of any colors may be done with black and gray. Traditional ink sets generally define the neutral axis using a composite black ink or pure black ink. A pure black ink may, in some instances, be very grainy. A composite black (mixing cyan, magenta, and yellow on paper) may, in some instances, be difficult to control, especially as more inks are added and/or across media without having closed loop color calibration. Further, when printing black and white with a 3 ink system (CMY), dark areas require a lot of ink, generally flooding the media with resulting loss of detail, particularly in shadowed areas. Gray inks are able to print a black and white/gray scale with outstanding definition and clarity, because less ink is required to get the same image.

Flesh tones, where deposited, may be defined by a combination that includes light magenta, cyan, and gray inks, substantially without appreciable presence of cyan ink. In ink systems using composite black, cyan and light cyan inks may be used to reduce chroma of oranges and to modulate L* for creating flesh tones. However, in some instances, these cyan ink dots may look grainy. Without being bound to any theory, it is believed that embodiments of the ink set of the present disclosure including the gray ink substantially eliminate and/or reduce usage of the cyan ink in flesh tones, and thus substantially eliminate the grainy look. As used herein, "appreciable presence" is taken to mean incidence of a color or pigment (e.g. cyan) at a level greater than random. For example, the amount of cyan ink used may be limited to an amount smaller than the amount of gray ink used. Thus, while an incidental drop of dark magenta may be tolerated in the flesh region, it is contemplated that no appreciable levels of dark magenta are present and/or may be detected or perceived. Under humid conditions, in normal 3-ink CMY and 6-ink CMYcmk printing, humid hue shift is a problem—colorant in ink drops that are placed adjacent to each other may migrate, shifting the neutral and gray areas to the color of the colorant that migrates fastest. For certain inks, this gives a red shift to neutral and skintone areas of images. In the inks of the present disclosure, the colorants are intimately mixed in the ink and on the media so color shift due to colorant migration under humid conditions is greatly reduced. In a typical 6-ink printing system, gray and neutral areas are a product of CMY and cmk inks. Usually multiple pens are used to deliver inks in 6-ink systems. There is often a drop-weight variation between pens, and even though this is minimized, it may not generally be completely eliminated. The result is that neutral and skintone areas of images printed using 6-ink CMYcmk are often color shifted or producing an off hue. When a pen having the inks of the current disclosure are used there are substantially few, if any problems with the hue shift in neutral areas. The resulting images are thus rendered more accurately.

It is to be understood that the visible wavelength of peak absorbance for the various colored inks occurs between about 375 nm and about 700 nm on the visible spectrum. It is to be further understood that the black ink absorbance may occur anywhere on the visible spectrum. Still further, the peak absorbance may be used to specify the pigment and/or dye load for a particular ink.

In embodiment(s) of the ink set of the present disclosure, the ratio of colorant loads of the dark and light inks at a 1:10,000 dilution of ink in water may range between about 2:1 and about 5:1, dark ink to light ink. For example, if a yellow ink has a colorant load sufficient to provide UV absorbance of 0.2 at a 1:10,000 dilution of ink in water; then a black ink may have a colorant load sufficient to provide UV absorbance ranging between about 0.4 and about 1 at a 1:10,000 dilution of ink in water. In another embodiment, the ratio of colorant loads of the dark and light inks at a 1:10,000 dilution of ink in water may be about 3:1.

In an alternate embodiment, the colorant loads may be as follows: cyan having a pigment and/or dye load sufficient to provide a visible wavelength of peak absorbance ranging between about 0.047 and about 0.057 at a 1:10,000 dilution of ink in water; yellow having a pigment and/or dye load sufficient to provide a visible wavelength of peak absorbance ranging between about 0.09 and about 0.11 at a 1:10,000 dilution of ink in water; gray having a pigment and/or dye load sufficient to provide a visible wavelength of peak absorbance ranging between about 0.024 and about 0.029 at a 1:10,000 dilution of ink in water; magenta having a pigment and/or dye load sufficient to provide a visible wavelength of peak absorbance ranging between about 0.072 and about 0.088 at a 1:10,000 dilution of ink in water; and black having a pigment and/or dye load sufficient to provide a visible wavelength of peak absorbance ranging between about 0.072 and about 0.088 at a 1:10,000 dilution of ink in water.

In a specific non-limiting example of an embodiment of the five-pen or six-pen ink set, the colorant loads are sufficient to provide the following visible wavelength peak absorbances.

It is contemplated that the cyan employed in the five-pen or six-pen ink set may have sufficient chroma to match and/or exceed the silver halide gamut in fully saturated cyans, blues and greens while providing a dot visibility essentially equivalent to that of light magenta and gray. At certain colorant loads (e.g. those indicated above), the cyan may match the dot visibility of the gray, thus providing an ink system that is well balanced for dot visibility and grain.

When gloss enhancer is used, such gloss enhancer may, in a non-limiting example, be composed of the "Additional Ingredients" listed in Table 2, plus 75-85% water, and, in addition, a film forming resin or combination of film forming resins either being in the solution as fully soluble polymers or as a colloidal dispersion/latex. Non-limiting examples of such film forming resins can be poly-styrene/acrylic resins (Joncryl 586 or Joncryl 683 from Johnson Polymers) or styrene/acrylic polymers manufactured by Dainippon.

Embodiment(s) of the ink set of the present disclosure may be used, but are not limited to being used in the following devices: ink cartridges having tanks/reservoirs accommodating each of the inks; recording units having tanks/reservoirs housing each of the inks and ink-jet heads for discharging the respective inks; ink systems; and printing systems adapted to detachably attach ink cartridges having the inks therein. It is to be understood that ink cartridges may further include a storage device adapted to store information regarding a quantity of ink in each of the ink tanks/reservoirs in a readable, write-able, and/or volatile manner.

An ink-jet recording/printing method utilizing embodiments of the ink sets include first preparing the desired ink set (e.g. a five-pen or six-pen ink set). The recording/printing methods may be used for forming text or images on an image-recording/receiving medium. The method further includes preferentially depositing dark color inks (e.g. black and/or dark magenta) on the image-recording medium. Additionally, light color inks (e.g. cyan, yellow, and gray) are preferentially deposited on the image-recording medium.

In an alternate embodiment of the method, a printer that is responsive to digital data signals is loaded with an ink-jet recording medium having an image-receiving layer thereon. The printer may also be loaded with an embodiment of the ink set (e.g. an ink set housed in an ink cartridge). In response to the digital data signals, the printer dispenses the ink-jet inks from the ink set onto the image-recording medium.

The above embodiments are provided to set forth some examples. Those skilled in the art will appreciate modifications that are also within the scope of embodiments of the present disclosure. A typical formulation for an ink useful in the practice of this application may include a pigment or dye, present at loads in the ranges described hereinabove; one or more solvents or co-solvents, present in an amount ranging between about 5 wt. % and 30 wt. %, and one or more non-ionic, cationic, and/or anionic surfactants, present in an amount ranging between about 0.001 wt. % and about 10 wt. %, for example. The balance of the formulation may be water (e.g. purified water), or other vehicle components such as biocides, viscosity modifiers, materials for pH adjustment, sequestering agents, preservatives, and/or the like.

It is to be understood that embodiments of the present disclosure may be practiced using other inkjet printing methods/inks. These include, but are not limited to UV-curable inks which may have a composition of greater than about 90% reactive solvents and polymeric binders, and glycol-based, "ECO-solvent," ink formulations. Typical solvent concentrations for the glycol-based ink formulations may range up to about 70%.

Classes of solvents/co-solvents include, but are not limited to aliphatic alcohols, aromatic alcohols, diols, glycol ethers, polyglycol ethers, caprolactams, formamides, acetamides, long chain alcohols and/or mixtures thereof. Specific non-limiting examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs of polyethylene glycol alkyl ethers, N-alkyl caprolactams, unsubstituted caprolactams, both substituted and unsubstituted formamides, both substituted and unsubstituted acetamides, and the like. Specific non-limiting examples of solvents include trimethylolpropane, 2-pyrrolidinone, and 1,5-pentanediol.

One or more of many surfactants may also be used in the ink formulations. Suitable non-limiting examples of surfactants include alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and mixtures thereof.

Various other additives may be employed to optimize the properties of the ink composition for specific applications. Examples of these additives are those added to inhibit the growth of harmful microorganisms. These additives may be biocides, fungicides, and other microbial agents, which may be routinely used in ink formulations. Examples of suitable microbial agents include, but are not limited to, commercially available NUOSPET (Nudex, Inc.), UCARIDE (Union Carbide Corp. located in Houston, Tex.), VANCIDE (R. T. Vanderbilt Co. located in Norwalk, Conn.), PROXEL (ICI America), and mixtures thereof.

Sequestering agents such as EDTA (ethylenediamine tetraacetic acid) may be included to eliminate the deleterious effects of heavy metal impurities; and buffer solutions may be used to control the pH of the ink. Viscosity modifiers and buffers may also be present, as well as other additives to modify properties of the ink as desired. Such additives may be present in an amount ranging between about 0.0001 wt. % and about 1 wt. %.

Suitable image-recording media include a substrate. Non-limiting examples of suitable substrate materials include paper, photo-based porous media, photo-based swellable media, polymeric materials (non-limiting examples of which include polyester white film or polyester transparent film), photopaper (non-limiting examples of which include polyethylene or polypropylene extruded on one or both sides of paper), metals, and/or mixtures thereof.

EXAMPLES

To further illustrate embodiment(s) of the present disclosure, the following examples are given. It is to be understood that these examples are provided for illustrative purposes and are not to be construed as limiting the scope of embodiment(s) of the present disclosure.

Example 1

Cyan, magenta, yellow, black and gray inks as described in Table 3 were tested for dot visibility and L*. Cyan and gray inks have very similar dot visibility, while the yellow ink has less and the black and magenta inks have considerably more. The black and magenta inks have noticeably darker L*. The cyan ink has an L* value similar to the gray and hence no light cyan was required. It is to be understood that a conventional cyan would have been darker (more colorant) in order to enable sufficient gamut across a wide range of media. The present inventors were able to make embodiments of the ink set of the present application by incorporating a single cyan sufficient to achieve the desired gamut and dot visibility, while eliminating the need for a cyan ink which achieves the target at the ink limit of the media used.

TABLE 3

Weight Percentage of Components based on UV Absorbance Values

| Ingredient | C | M | Y | K | k |
|---|---|---|---|---|---|
| DB-199 Na | 0.052 | | | | |
| DJR-814 Na | | 0.04 | | 0.01 | 0.00445 |
| AR52 Na | | 0.04 | | | |
| Y1189 | | | 0.1 | 0.01 | 0.002225 |
| Duasyn NB-SF | | | | 0.08 | 0.0267 |
| Table 2 Cmpn | 50 | 50 | 50 | 50 | 50 |
| Water | Balance | Balance | Balance | Balance | Balance |

Example 2

Cyan ink and a gloss enhancer (X1 Optmzr) were printed together on Premium Glossy Photo Paper (PGPP) to test the effect of gloss enhancer on gloss uniformity. Results were obtained and graphed in the graph in FIG. 3. The X axis shows the increasing amount of ink with Square 1 meaning no ink, just media. The Y axis shows the increasing gloss at 20° C. The square points forming the top curve of the graph are designated "Xon", which indicates that the gloss enhancer is on. The circular points forming the bottom curve of the graph are designated "Xoff", which indicates that the gloss enhancer is off. The results of the test illustrated on the graph show that gloss was more uniform across ink densities when a gloss enhancer was used along with the pigmented ink. In a perfect system the curve on the graph would be a flat, horizontal line.

While several embodiments have been described in detail, it will be apparent to those skilled in the art that the disclosed embodiments may be modified. Therefore, the foregoing description is to be considered exemplary rather than limiting.

What is claimed is:

1. An ink-jet printing system, comprising:
an ink set of only five inks, having cyan, magenta, yellow, black, and gray inks; and
a print medium having a substantially neutral color;
wherein said gray ink has a lightness ($L^*$) between 30% and 70% of a lightness ($L^*$) of said print medium.

2. The system of claim 1 wherein the substantially neutral color of said print medium has a maximum $a^*$ deviation ±2 and a maximum $b^*$ deviation of ±4 from absolute CIELAB space hue neutrality.

3. The system of claim 1 wherein said print medium is porous.

4. The system of claim 2 wherein said print medium comprises a swellable ink-receiving layer.

5. The system of claim 1 wherein the magenta ink-jet ink has a visible wavelength of peak absorbance ranging between about 0.01 and about 0.06 at a 1:10,000 dilution of ink in water, measured in a spectrophotometer having a sample cell with a 1.0 centimeter path length.

6. The system of claim 1 wherein the cyan ink-jet ink has a visible wavelength of peak absorbance ranging between about 0.01 and about 0.10 at a 1:10,000 dilution of ink in water, measured in a spectrophotometer having a sample cell with a 1.0 centimeter path length.

7. The system of claim 1 wherein the gray ink-jet ink has a visible wavelength of peak absorbance ranging between about 0.001 and about 0.05 at a 1:10,000 dilution of ink in water, measured in a spectrophotometer having a sample cell with a 1.0 centimeter path length.

8. The system of claim 1 wherein the cyan ink-jet-ink is a cyan ink having a visible wavelength of peak absorbance ranging between about 0.047 and about 0.057 at a 1:10,000 dilution of ink in water, measured in a spectrophotometer having a sample cell with a 1.0 centimeter path length.

9. The system of claim 1 wherein the black ink-jet ink has a visible wavelength of peak absorbance ranging between about 0.02 and about 0.75 at a 1:10,000 dilution of ink in water, measured in a spectrophotometer having a sample cell with a 1.0 centimeter optical path length.

10. The system of claim 1 wherein said gray and black inks have a fade resistance equal to or better than said cyan, magenta, and yellow inks.

11. The system of claim 1 wherein said cyan, magenta, and yellow inks have substantially equivalent fading rates.

12. The system of claim 1 wherein said gray ink, when printed, has a maximum $a^*$ deviation of ±1 from said substantially neutral color of said print medium and a maximum $b^*$ deviation of ±2 from said substantially neutral color of said print medium.

13. The system of claim 12 wherein said gray ink maintains said maximum $a^*$ deviation and said maximum $b^*$ deviation when printed at different densities on said print medium.

14. The system of claim 1 further comprising a gloss enhancer.

15. The system of claim 1 wherein an $L^*$ of the gray ink over a printed field is equivalent to an $L^*$ of a single dot of the black ink.

16. The system of claim 1 wherein a same black dye is used in both said black ink and said gray ink.

17. A six-pen ink set for ink-jet printing, one of the pens in the six-pen ink set having gloss enhancer rather than ink, the six-pen ink set comprising:
a gray ink-jet ink having a pigment capable of providing a printed visible wavelength of peak absorbance ranging between about 0.001 and about 0.05 at a 1:10,000 dilution of ink to water;
a cyan ink-jet ink having a pigment capable of providing a printed visible wavelength of peak absorbance ranging between about 0.01 and about 0.10 at a 1:10,000 dilution of ink to water;
a black ink-jet ink having a pigment capable of providing a printed visible wavelength of peak absorbance ranging between about 0.02 and about 0.75 at a 1:10,000 dilution of ink to water;
a yellow ink-jet ink having a pigment capable of providing a printed visible wavelength of peak absorbance ranging between about 0.01 and about 0.2 at a 1:10,000 dilution of ink to water;
a magenta ink-jet ink having a pigment capable of providing a printed visible wavelength of peak absorbance between about 0.02 and about 0.5 at a 1:10,000 dilution of ink to water; and
the gloss enhancer;
wherein said peak absorbances are measured in a spectrophotometer having a sample cell with an optical path length of 1.0 centimeter.

18. The ink set of claim 17 wherein said black and gray inks has a fade resistance equal to or greater than said cyan, magenta, and yellow inks.

19. The ink set of claim 17 wherein said grey ink is printed on a print medium and the print medium has a substantially neutral color, and wherein said grey ink has a CIELAB $a^*$ value within 1 point of an $a^*$ value of said substantially neutral color of said print medium and a CIELAB $b^*$ value within 2 points of a $b^*$ value of said substantially neutral color of said print medium.

20. The ink set of claim 17 wherein color images printed using said ink set exhibit increased lightfastness over similar color images printed using traditional KCMY or KCMYcm ink sets.

21. An inkjet printing system, comprising: an ink set as defined in claim 20, a porous print medium; and a plurality of two-color printheads configured to contain said inks and deposit said inks on said porous print medium.

* * * * *